United States Patent
Balagopal et al.

(10) Patent No.: US 10,132,161 B2
(45) Date of Patent: Nov. 20, 2018

(54) STRAIN LOCKED FIBER OPTIC CABLE AND METHODS OF MANUFACTURE

(71) Applicants: Ajit Balagopal, Christiansburg, VA (US); Juan P. Franco, Blacksburg, VA (US); Paul F. Wysocki, Blacksburg, VA (US)

(72) Inventors: Ajit Balagopal, Christiansburg, VA (US); Juan P. Franco, Blacksburg, VA (US); Paul F. Wysocki, Blacksburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/961,410

(22) Filed: Apr. 24, 2018

(65) Prior Publication Data

US 2018/0245460 A1    Aug. 30, 2018

Related U.S. Application Data

(62) Division of application No. 14/792,944, filed on Jul. 7, 2015.

(60) Provisional application No. 62/033,902, filed on Aug. 6, 2014.

(51) Int. Cl.
- *G02B 6/00* (2006.01)
- *E21B 47/12* (2012.01)
- *G02B 6/44* (2006.01)

(52) U.S. Cl.
CPC .......... *E21B 47/123* (2013.01); *G02B 6/4413* (2013.01); *G02B 6/4415* (2013.01); *G02B 6/4435* (2013.01)

(58) Field of Classification Search
None
See application file for complete search history.

(56) References Cited

U.S. PATENT DOCUMENTS

| | | | | |
|---|---|---|---|---|
| 5,973,783 | A * | 10/1999 | Goldner | G01C 19/722 356/465 |
| 2003/0123828 | A1* | 7/2003 | Garito | C08G 65/007 385/129 |
| 2008/0271926 | A1* | 11/2008 | Coronado | E21B 17/026 166/66 |
| 2009/0103864 | A1* | 4/2009 | Hamasaki | G02B 6/4239 385/31 |
| 2011/0058778 | A1* | 3/2011 | Herbst | G01M 5/0091 385/100 |

* cited by examiner

*Primary Examiner* — Chris Chu
(74) *Attorney, Agent, or Firm* — Cantor Colburn LLP

(57) ABSTRACT

An embodiment of a method of manufacturing a fiber optic cable includes selecting a cable support structure configured to support an optical fiber sensor, adhering the optical fiber sensor to the cable support structure by applying a temporary adhesive, and installing a protective layer around the cable support structure and the temporarily adhered optical fiber sensor. The method further includes removing a bond between the optical fiber sensor and the temporary adhesive, wherein removing the bond includes injecting a debonding material into a space formed between the cable support structure and the protective layer, and injecting a permanent adhesive into the space, the permanent adhesive configured to immobilize the optical fiber sensor relative to the protective layer and allow strain to be transferred from the protective layer to the optical fiber sensor.

12 Claims, 5 Drawing Sheets

STRAIN LOCKED FIBER OPTIC CABLE AND METHODS OF MANUFACTURE

CROSS REFERENCE TO RELATED APPLICATIONS

This divisional application claims the benefit of an earlier filing date from U.S. Non-provisional application Ser. No. 14/792,944 filed on Jul. 7, 2015, which claims the benefit of U.S. Provisional Application Ser. No. 62/033,902 filed Aug. 6, 2014, the entire disclosure of which is incorporated herein by reference

BACKGROUND

Optical fibers find use in a variety of applications. For example, in the drilling and completion industry, optical fibers find use as both communication media and sensing media for measuring various downhole parameters and operation parameters. For example, an optical fiber sensor can be deployed with a downhole string or carrier, and utilized to measure parameters such as temperature and strain. Such fibers are typically attached to a protective tube or cable that protects the optical fiber while transferring strain from the downhole carrier to the fiber.

SUMMARY

An embodiment of a method of manufacturing a fiber optic cable includes selecting a cable support structure configured to support an optical fiber sensor, adhering the optical fiber sensor to the cable support structure by applying a temporary adhesive, and installing a protective layer around the cable support structure and the temporarily adhered optical fiber sensor. The method further includes removing a bond between the optical fiber sensor and the temporary adhesive, wherein removing the bond includes injecting a debonding material into a space formed between the cable support structure and the protective layer, and injecting a permanent adhesive into the space, the permanent adhesive configured to immobilize the optical fiber sensor relative to the protective layer and allow strain to be transferred from the protective layer to the optical fiber sensor.

An embodiment of a temporary fiber optic cable assembly includes a cable support structure configured to support an optical fiber sensor, a protective layer disposed around the cable support structure and the optical fiber sensor, the protective layer forming a space between the cable support structure and the protective layer, and a temporary adhesive securing the optical fiber to the cable support structure, the temporary adhesive configured to be removed by injecting a debonding material into the space prior to injecting a permanent adhesive into the space.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

There are provided fiber optic cables and methods of manufacturing strain sensitive fiber optic cables. An exemplary fiber optic cable includes one or more fiber optic components such as optical fibers and optical fiber bundles, an elongated central body, and an elongated sleeve or other protective layer surrounding the central elongated body. An embodiment of a method of manufacturing the optical fiber cable includes attaching an optical fiber to a carrier or support structure such as a cable core member using a temporary adhesive, to enable the optical fiber and support structure to be safely handled prior to being disposed or cabled in a protective layer such as a metal cladding. Upon or after disposing the protective layer, a fluid material such as a solvent is run through the cable to remove the temporary adhesive or at least remove the bond between the support structure and the optical fiber. A permanent adhesive, such as a high temperature epoxy, is pumped into the cable to strain lock the optical fiber to at least the protective layer and complete the assembly of the strain sensitive optical fiber cable.

Figure 1:
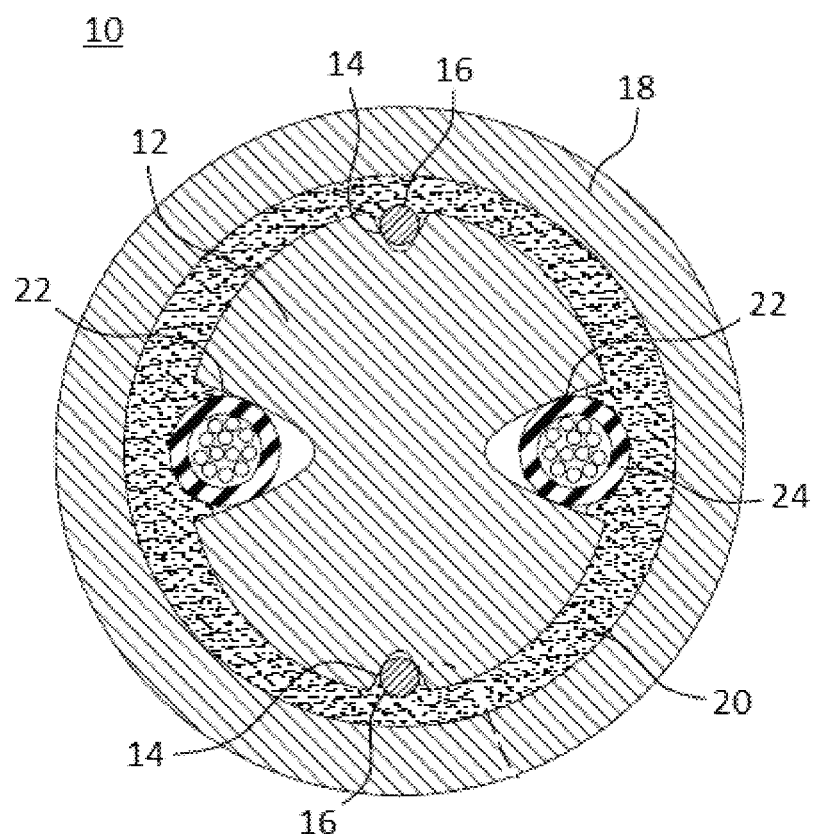
FIG. 1 is an axial cross-sectional view of an embodiment of a strain transferring fiber optic cable.

FIG. 1 illustrates an embodiment of a sensing assembly such as a strain sensing cable 10. A "cable" as described herein may include any device or apparatus configured to support one or more optical fibers and including a protective sheath or layer, and is not limited to the embodiments described herein.

The cable 10 includes a support structure such as an elongated core or central member 12, which has one or more channels or grooves 14. The grooves 14 are shaped or configured to accommodate one or more optical fiber sensors 16. A "groove" as described herein may encompass grooves, flutes, trenches, depressions, indentations, or any other structure formed in the central member 12 for receiving and positioning one or more optical fiber sensors 16. An "optical fiber sensor" as described herein includes at least an optical fiber and one or more sensing locations in the fiber core and/or cladding, such as fiber Bragg gratings or intrinsic scattering properties, which are employed to sense or measure various parameters.

In this embodiment, the grooves 14 extend axially (i.e., parallel to the longitudinal axis of the cable) and follow a spiral path. It is noted that the configuration shown in FIG. 1 is only an example; other cores may include any number of grooves having various paths, or not include any grooves. Thus, the central member may have any suitable shape or configuration that allows optical fiber sensors to be attached thereto.

A protective sheath or layer 18 is disposed around the central member 12 and the optical fiber sensors 16, and is made of metallic (e.g., steel) or other materials sufficient to protective the optical fiber sensors 16 from a downhole environment or other environment in which the cable 10 is to be used. An adhesive material 20 is disposed between the protective layer 18 and the central member 12, and immobilizes the optical fiber sensor 16 relative to the protective layer 18 and/or the central member 12 and to strain lock the optical fiber sensors 16 to at least the protective layer 18 in order to facilitate strain transfer to the optical fiber sensors 16. In one embodiment, as shown in FIG. 1, the adhesive 20 is disposed within spaces and/or interstices formed between the central member 12 and the protective layer 18. For example, the adhesive 20 is pumped into the spaces so that the adhesive at least partially fills the spaces and strain locks the optical fiber sensors 16.

The central member 12 is shown as forming a solid core, but is not so limited. For example, a central bore may be included to hold additional components, such as optical fibers, electrical conductors and communication lines. In addition, the central member 12 may include additional channels 22 to contain additional elements or optical fiber sensors such as one or more Fiber in Metal Tube (FIMT) cables 24.

The one or more optical fiber sensors 16 are strain locked with the protective layer 18, by adhering an optical fiber sensor 16 to immobilize at least a portion of the optical fiber sensor 16 relative to at least the protective layer 18. Thus, external forces are directly transferred from the protective layer 18 to the optical fiber 16, allowing the forces to be measured using various techniques. This arrangement ensures that the one or more optical fibers 16 will be responsive to forces that act on the protective layer 18 and which may or may not be transferred to the central member 12.

Figure 2:
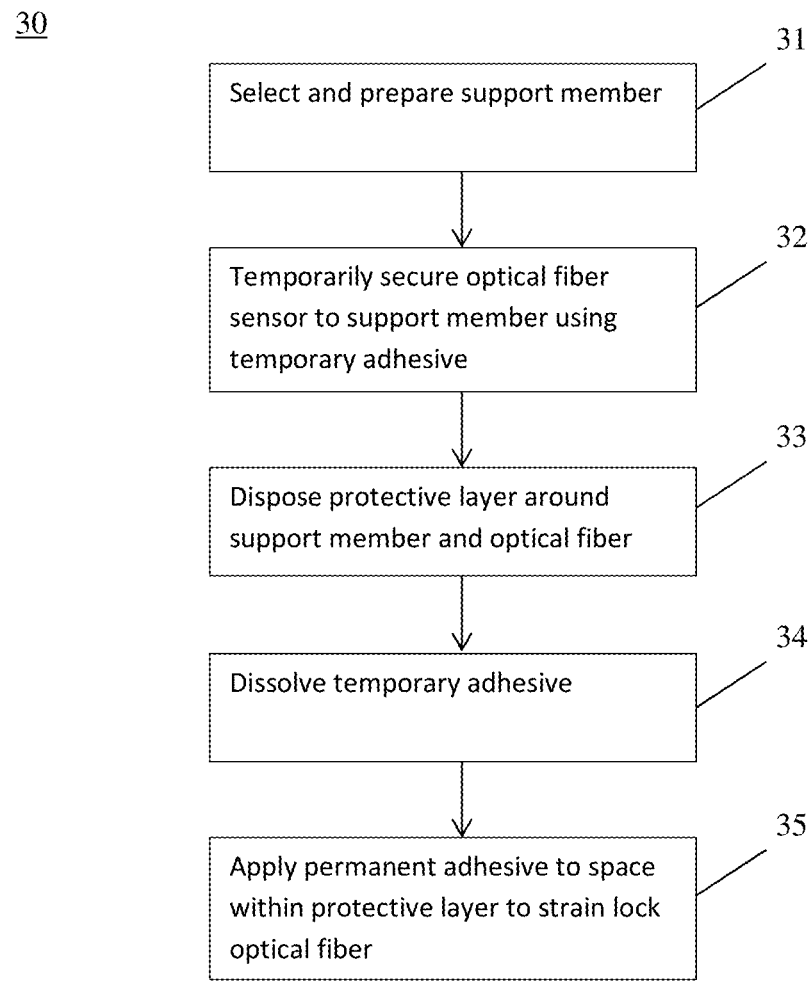
FIG. 2 is a flow chart illustrating an embodiment of a method of manufacturing a strain transferring fiber optic cable.

FIG. 2 illustrates an embodiment of a method 30 of manufacturing an optical fiber sensing cable. The method 30 includes one or more stages 31-35. Although the method 30 is described in conjunction with the strain locked cable 10, the method 30 is not limited to use with these embodiments. In one embodiment, the method 30 includes the execution of all of stages 31-35 in the order described. However, certain stages may be omitted, stages may be added, or the order of the stages changed.

Figure 3:
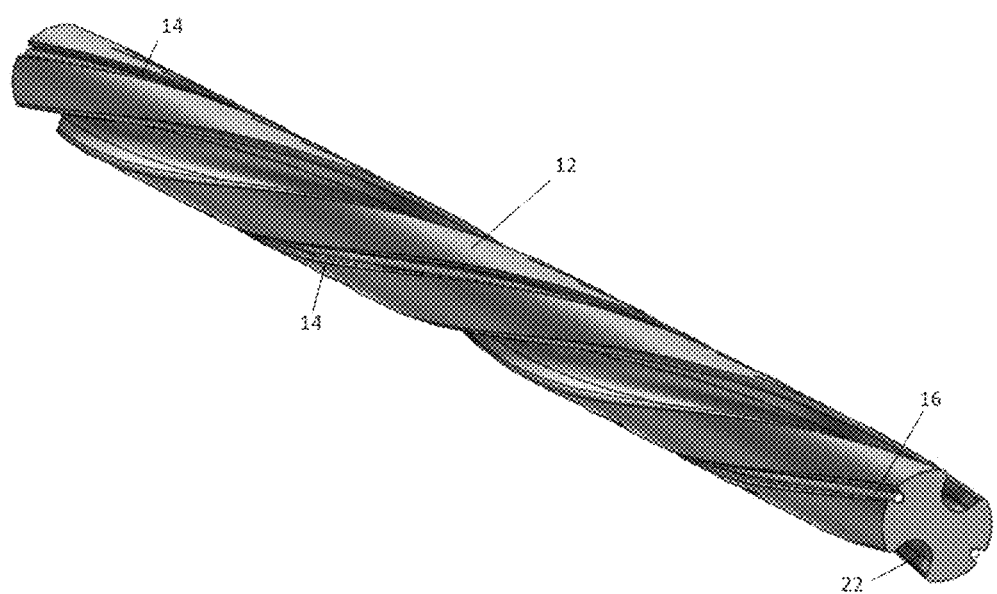
FIG. 3 depicts a cable support structure, such as a core member, having one or more optical fiber sensors adhered thereto.

In the first stage 31, a support member such as the central member 12 is selected or manufactured. The central member 12 is an elongated body that has any suitable shape or configuration to hold one or more optical fibers in a desired path within the cable. An exemplary support member is shown in FIG. 3, which is formed from a material such as aluminum or stainless steel and includes grooves 14.

In the second stage 32, one or more optical fiber sensors, such as the optical fiber sensors 16, are temporarily attached or adhered to the support member. The optical fiber sensors 16 may be configured as sensors including multiple Bragg gratings or other scattering and/or sensing locations, temperature sensors such as distributed temperature sensing (DTS) sensors, seismic sensors, acoustic sensors, pressure sensors, strain sensors and others.

For example, each optical fiber sensor 16 is disposed within a groove 14 and adhered or attached to the groove 14 using a temporary adhesive that is dissolvable in a suitable solvent. The groove 14 may be spiral or follow another path, and provides the ability to handle the support member before and during a cladding process without any damage to the fiber. The cladding process includes disposing a sleeve, tube, cladding or other protective layer over the support member to protect the support member and optical fiber when they are deployed in a downhole or other environment for sensing.

In one embodiment, the temporary adhesive is readily dissolvable by a suitable solvent or debonder, such that the temporary adhesive can be easily removed once the protective layer is disposed in place around the support member. In one embodiment, the temporary adhesive is a glue or other fluid adhesive that can be applied to the support member and the optical fiber sensor. An example of a temporary adhesive is a cyanoacrylate adhesive such as methyl cyanoacrylate or ethyl cyanoacrylate. Other examples include organic adhesives (e.g., latex), polyimide adhesives such as polyisocyanurate resins, and other polymer adhesives such as epoxies, polyethylene glues, polyurethanes, silicones and polyester resins. In addition to fluid adhesives, other types of securing materials can be used, such as tape or string made from a material that can be dissolved after the protective layer is assembled.

It is noted that the temporary adhesive can be applied along any selected section or length of the support member. For example, a length of the optical fiber cable can be selected that is to be attached to a component for strain sensing. An optical fiber sensor can be adhered along the entire path of the optical fiber sensor along the selected length. In another example, since the temporary adhesive is used for a temporary assembly, the optical fiber sensor can be adhered at multiple points or locations to hold the optical fiber sensor generally in place prior to installing a protective layer and subsequent permanent adhesive.

Figure 4:
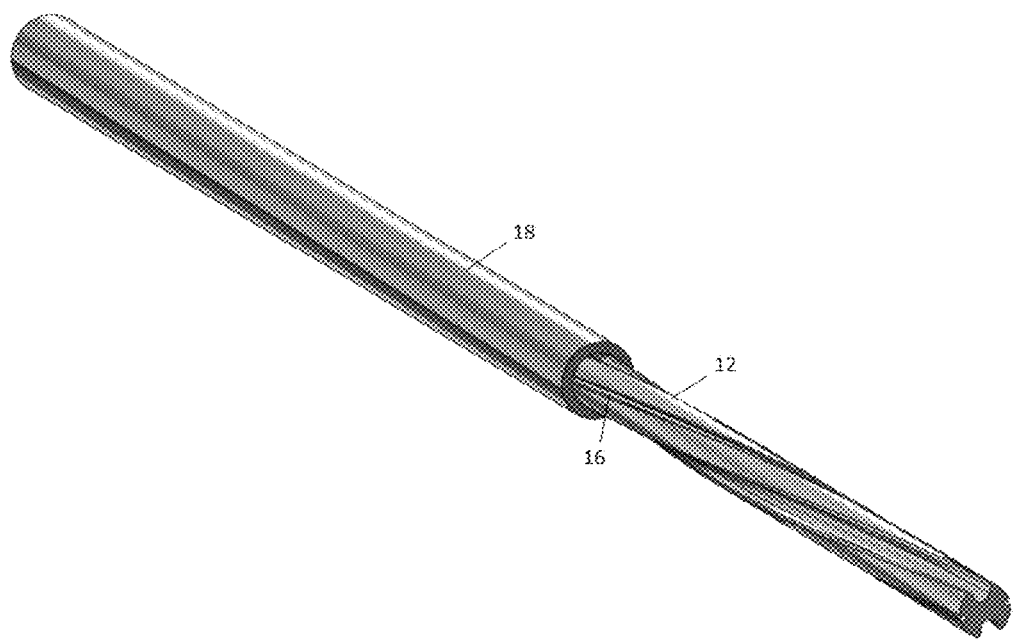
FIG. 4 depicts a protective cladding being installed on the core member and optical fiber sensors of FIG. 3.

In the third stage 33, a protective layer is disposed around the support member and optical fiber sensors. For example, as shown in FIG. 4, the cable is clad by sliding or otherwise installing a metal cladding or other protective layer 18 over the central member 12. Various spaces are formed between the central member and the cladding.

In the fourth stage 34, the bond between the optical fiber sensor and the support member is removed. In one embodiment, the temporary adhesive is dissolved, e.g., by a suitable solvent or debonder. For example, a solvent is washed through the structure formed by the protective layer and support member, and at least partially dissolves the temporary adhesive. The solvent is removed by, e.g., allowing it to drain from the structure. The solvent may be flushed through the structure or temporarily sealed within the structure for a selected period of time to allow the solvent to partially or fully dissolve the temporary adhesive.

Various solvents or debonders can be used. For example, if the temporary adhesive is a cyanoacrylate adhesive or other polymer adhesive, a suitable solvent such as acetone, nitromethane, dimethyl sulfoxide, and methylene chloride may be pumped or otherwise introduced into the spaces formed between the support structure and the protective layer.

Other means for debonding the optical fiber sensor may be used. For example, an adhesive that has a relatively low melting point or temperature resistance can be used, as long as the temperature is within a range that will not damage or compromise the optical fiber sensors. After the protective layer is applied, the cable can be heated to soften or melt the temporary adhesive, and the temporary adhesive can be drained or flushed from the cable.

In the fifth stage 35, a permanent adhesive (e.g., the adhesive 20) is applied to at least the optical fiber sensor and the protective layer to strain lock the optical fiber to the protective layer. In one embodiment, a high temperature (e.g., a temperature found in a downhole environment) adhesive is applied to spaces within the assembled cable and cured (if necessary) to achieve strain transfer with a high level of sensitivity.

For example, a high performance epoxy is injected through the cable to at least partially fill the spaces between the optical fiber and the protective layer. The epoxy is cured, completing the strain lock. Examples of such epoxies include Duralco™ epoxies manufactured by Cotronics Corp., and Araldite® epoxies. Any suitable fluid epoxy or other adhesive that can be pumped or otherwise introduced into the cable structure, and has sufficient temperature resistance (e.g., about 150-220 degrees C.) to maintain the strain lock in intended sensing environments may be used.

In one embodiment, the permanent adhesive includes a solvent component to debond or at least partially dissolve the temporary adhesive, allowing stages 54 and 55 to be performed simultaneously. For example, a relatively low temperature or weakly bonding adhesive is applied as the temporary adhesive, and the permanent adhesive includes a solvent that acts on the temporary adhesive when the permanent adhesive is introduced. Once the bond between the temporary adhesive and the optical fiber sensor is weakened or broken, the permanent adhesive is cured to harden and set the permanent adhesive. An exemplary temporary adhesive is a cyanoacrylate adhesive, and an exemplary permanent adhesive is high temperature epoxy or other adhesive that includes acetone in the adhesive fluid.

Figure 5:
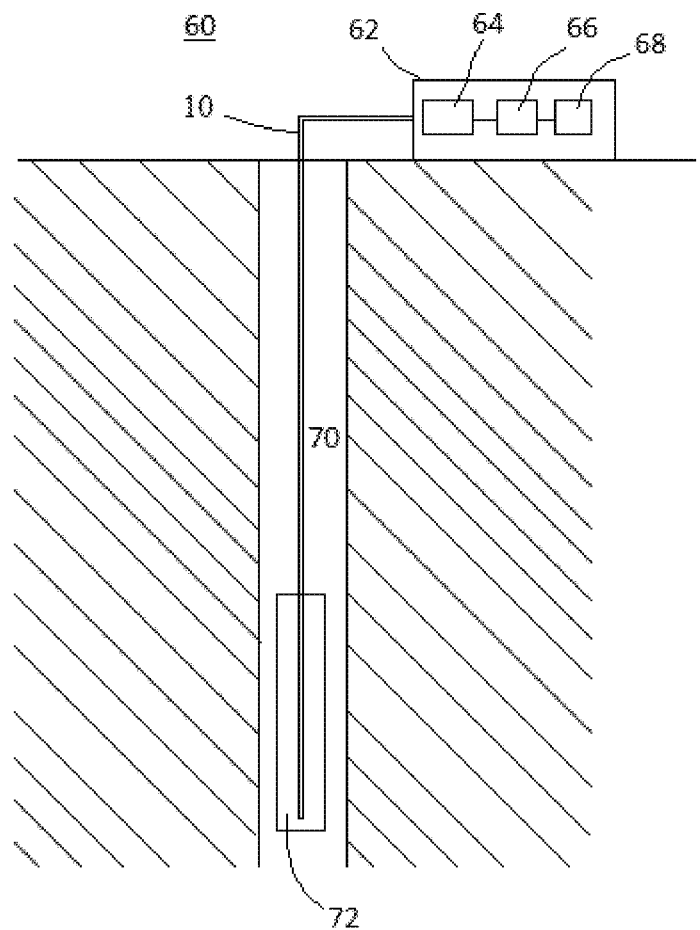
FIG. 5 is a side cross-sectional view of an embodiment of a downhole drilling, completion and/or measurement system.

An example of an application of the optical fiber cable 10 is shown in FIG. 5, in which a downhole measurement apparatus 60 is illustrated. The downhole measurement apparatus 60 is configured to measure various downhole parameters, such as strain, stress, temperature and pressure. The apparatus 60 includes a surface measurement unit 62 and the cable 10 including at least one strain locked optical fiber sensor, which may include scattering locations such as reflectors, Bragg gratings and Rayleigh scattering locations. The surface measurement unit 62 includes an optical signal source 64 such as a tunable laser, a detector 66 and a processing unit 68.

The cable 10 is configured to be disposed in a borehole 70 and extend along a desired length of the borehole 70. Exemplary parameters that can be measured using the optical fiber sensor include temperature, strain, pressure, position, shape and vibration. The optical fiber sensor may be configured as and/or part of any of a variety of measurement apparatuses or systems. For example, the optical fiber sensor 10 may be configured as a temperature sensor, a strain sensor, a distributed temperature sensor (DTS), an interferometer, an optical frequency-domain reflectometry (OFDR) or optical time-domain reflectometry (OTDR) sensor, and a distributed sensing system (DSS).

In one embodiment, at least a portion of the optical fiber cable 10 is disposed on or in relation to a carrier or tool 72, such as a drill string segment, downhole tool or bottomhole assembly. For example, a portion of the cable 10 is attached to the tool 72 such that any strain or deformation of the tool 72 is transferred to the cable (e.g., to a protective layer, which is strain locked to an optical fiber sensor disposed therein). As described herein, a "carrier" refers to any structure suitable for being lowered into a wellbore or for connecting a drill or downhole tool to the surface, and is not limited to the structure and configuration described herein. Examples of carriers include casing pipes, wirelines, wireline sondes, slickline sondes, drop shots, downhole subs, BHA's, drill string inserts, modules, internal housings and substrate portions thereof.

The apparatus 60 may be used in conjunction with methods for estimating various parameters of a borehole environment and/or downhole components. For example, a method includes disposing the optical fiber cable 10 and/or the carrier 72 downhole, emitting a measurement signal from the source 64 and propagating the signal through the optical fiber 10. The scattering locations reflect a portion of the signal back to the surface unit 62 through the optical fiber sensor 10. In some embodiments, the wavelength and/or phase of this return signal is shifted relative to the measurement signal due to parameters such as strain and temperature. The return signal is received by the surface unit 62 and is analyzed to estimate desired parameters.

The apparatuses and methods described herein provide various advantages over existing methods and devices. The methods described herein improve the manufacturing process for strain locked optical fiber cables, by providing means for temporarily securing optical fiber sensors after application of a protective layer and prior to applying permanent adhesives. The manufacturing process is simplified, in that the temporary adhesive can be removed and the permanent adhesive can be applied without requiring removal of the protective layer. In addition, the unfinished cable can be safely handled prior to being cabled in a protective cladding.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A method of manufacturing a fiber optic cable, comprising:
   selecting a cable support structure, the cable support structure configured to support an optical fiber sensor;
   adhering the optical fiber sensor to the cable support structure by applying a temporary adhesive;
   installing a protective layer around the cable support structure and the temporarily adhered optical fiber sensor;
   removing a bond between the optical fiber sensor and the temporary adhesive, wherein removing the bond includes injecting a debonding material into a space formed between the cable support structure and the protective layer; and
   injecting a permanent adhesive into the space, the permanent adhesive configured to immobilize the optical fiber sensor relative to the protective layer and allow strain to be transferred from the protective layer to the optical fiber sensor.

2. The method of claim 1, wherein the cable support structure is a cable core including at least one groove configured to hold the optical fiber sensor.

3. The method of claim 2, wherein the protective layer is a tube configured to be fit over and around the cable support structure.

4. The method of claim 1, wherein the debonding material is a solvent configured to at least partially dissolve the temporary adhesive.

5. The method of claim 4, wherein removing the bond includes removing the at least partially dissolved temporary adhesive prior to injecting the permanent adhesive.

6. The method of claim 4, wherein the permanent adhesive is a fluid adhesive that includes the solvent.

7. The method of claim 6, wherein removing the bond includes injecting the permanent adhesive, allowing the solvent to at least partially dissolve the temporary adhesive, and subsequently curing the permanent adhesive.

8. The method of claim 1, wherein the permanent adhesive has a temperature resistance that is higher than a temperature resistance of the temporary adhesive.

9. The method of claim 1, wherein the temporary adhesive results in a bond that is weaker than a bond formed by the permanent adhesive.

10. The method of claim 1, wherein the permanent adhesive is a fluid adhesive, and injecting the permanent adhesive includes pumping the fluid adhesive into the space, and subsequently curing the fluid adhesive.

11. The method of claim 1, wherein the optical fiber sensor includes at least one optical fiber, the at least one optical fiber connected to an optical source and configured to measure strain.

12. The method of claim 11, further comprising attaching the fiber optic cable to a downhole component to measure strain on the downhole component.

* * * * *